United States Patent Office 3,364,837
Patented Jan. 23, 1968

3,364,837
PRESSURE CONTROL SYSTEMS
Reginald George Schooling, Yeovil, Somerset, England, assignor to Westland Aircraft Limited, Yeovil, England
Filed Oct. 13, 1965, Ser. No. 495,474
Claims priority, application Great Britain,
Oct. 14, 1964, 41,872/64
21 Claims. (Cl. 98—1.5)

ABSTRACT OF THE DISCLOSURE

An electronic arrangement for controlling pressure in a pressure chamber where selection of a desired absolute pressure is made by adjustment of a potentiometer which produces a voltage related to the desired absolute pressure. This voltage has to be exceeded through a voltage developed by an absolute pressure transducer, acting through a transformer and bridge circuit, before a control is effected. Rate of change is effected by applying the absolute pressure signal from the absolute pressure transducer through another transformer and bridge circuit and a rate control potentiometer to a differentiating circuit to abstract the rate of change component from the absolute signal. The rate term thus derived by differentiation is amplified and applied to a comparator transistor.

---

Figure 1:
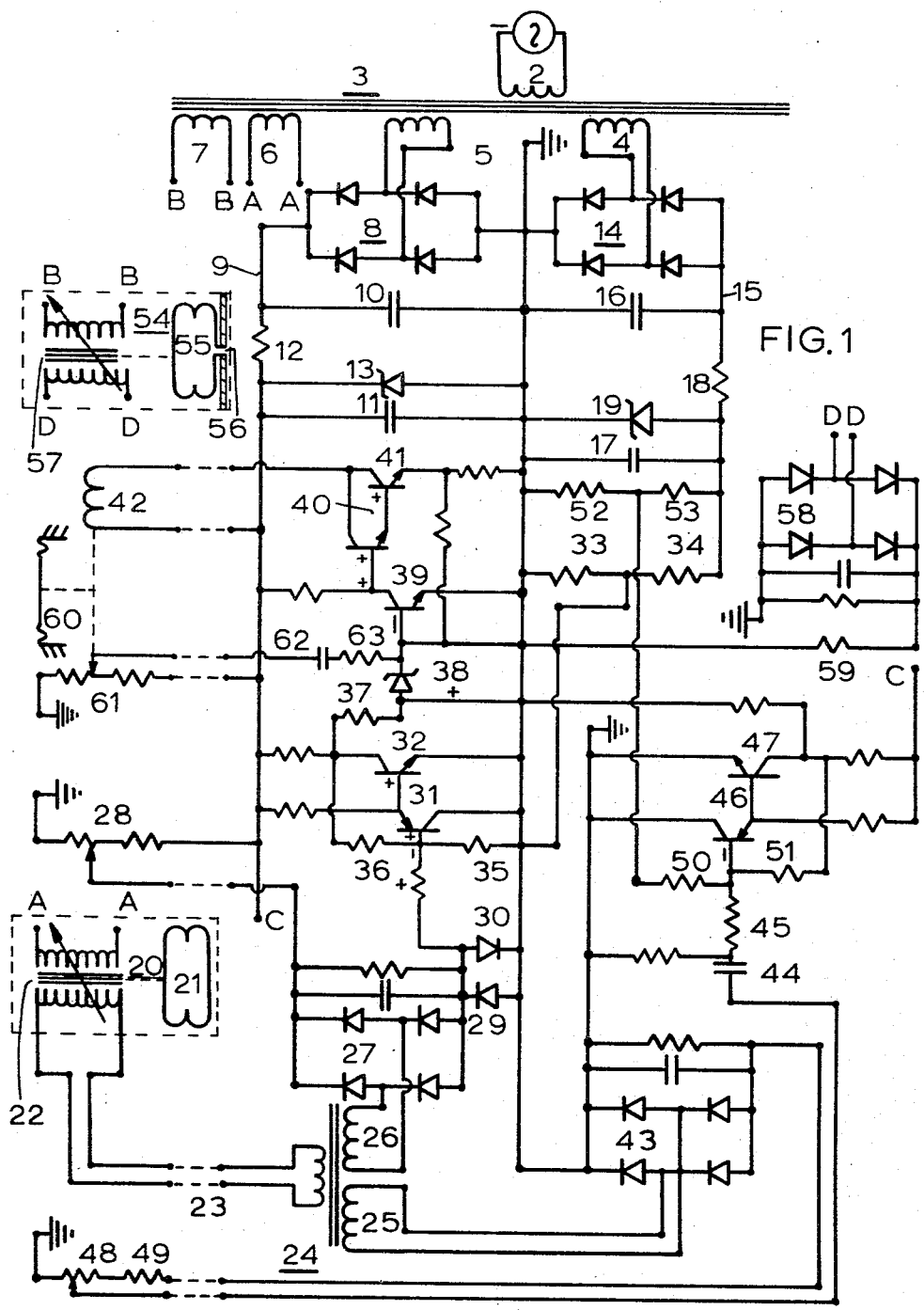

This invention relates to pressure control systems and relates particularly, though not exclusively, to aircraft cabin pressure control systems designed to provide means for controlling the cabin pressure during ascent, flight and descent of an aircraft without causing discomfort to the passengers. To achieve this object the cabin pressure (sometimes referred to as the cabin altitude) and the rate at which the cabin pressure changes are controlled to be substantially independent of the altitude or rate of change of altitude of the aircraft.

The invention relates to a control system which determines the operation of one or more valves admitting or exhausting air from an enclosed space. In the case of an aircraft control system, the input of air to the cabin can be conveniently obtained by tapping engine compressors or by means of special blowers.

A known aircraft cabin pressure control system incorporates a pneumatically operated valve having a control chamber provided with air at less than cabin pressure. The air pressure in this chamber is controlled by electric and electronic means influenced by three sensing elements, a cabin pressure sensor, a cabin differential pressure sensor and a cabin rate of pressure change sensor, frequently referred to as the absolute element, the differential element and the rate element respectivly. Each element consists of a capsule operating a transducer in which the input electrical supply to the transducer is taken from a power pack and the signals from the transducers are taken to an amplifier where they are combined to form a resultant control signal to the valve control chamber.

The absolute element is contained in the cabin pressure selector and when controlling at the selected pressure, the output of this unit alone, when amplified, is sufficient to control the operation of the valve.

Ideally the output signal from the rate element depends on the rate of pressure change, but in practice this ideal is difficult to achieve and maintain under transit and operating conditions, for example, changes of temperature pressure vibration and acceleration. The actual rate of change obtained is that sufficient to provide an output signal, of opposite phase or polarity to the output of the absolute element. The rate signal is combined with, and partly cancels, the signal from the absolute element and the resultant signal is employed to control the operation of the valve. Stops are provided to limit the output of the element.

The object of this invention is to provide a simpler and more reliable pressure control system than has been known hitherto, in particular for aircraft cabin pressurisation.

According to the present invention there is provided a control system for controlling the pressure of an enclosed space, the system including valve means, pressure selector means having an output voltage related to a selected pressure, an absolute element having an output related to the pressure of the enclosed space, and electronic means for comparing the output voltage from the selector means with the output voltage from the absolute element to produce an output controlling the valve means.

In the case where the enclosed space is an aircraft cabin, the control system according to the present invention includes valve means, cabin pressure selector means having an output voltage related to a selected pressure, an absolute element having an output voltage related to the cabin pressure, and electronic means for comparing the output voltage from the cabin pressure selector means with the output voltage from the absolute element to produce an output controlling the valve means.

In some applications the control system according to the present invention includes an electrical differentiating circuit, the output from the absolute element being differentiated by said circuit to produce an output voltage proportional to the rate of change of amplitude of said output voltage from the absolute element, the output voltage from the electrical differentiating circuit being applied to limit the rate of change of pressure within the enclosed space or said cabin. Conveniently, this is achieved by electronically comparing the output from the electrical differentiating network with the output from the absolute element and the output from the selector means in order to produce a modified output controlling the valve means.

In other applications the control system includes a differential element arranged to produce an output voltage when a maximum acceptable differential pressure value between the enclosed space or cabin pressure and the space or cabin external or ambient pressure is reached, said output voltage from the differential element overriding the output from the electronic means in order to control the valve means so that the differential pressure does not exceed said maximum acceptable value.

The electronic means produce with advantage, an output which opens the valve means when the selected pressure is less than the enclosed space or cabin pressure.

In another aspect we provide a control system, for controlling the pressure of an enclosed space including pressure selector means having an output signal related to a selected pressure, an absolute element having an output signal related to the pressure in the enclosed space, and a differentiating circuit producing from the absolute element output signal, a signal related to the rate of change of pressure.

In another aspect, the present invention provides a method of controlling an enclosed space, for example, an aircraft cabin, by a pressure control system, which includes valve means, the method including the steps of generating a voltage proportional to a selected pressure, generating a voltage proportional to the pressure of the enclosed space and comparing the two voltages by electronic means to produce an output voltage controlling the valve means.

In other aspects the method includes differentiating a voltage proportional to the pressure of the enclosed space in order to obtain a voltage proportional to the rate of change of pressure in the enclosed space and applying this voltage in opposition to the voltage controlling the valve means in order to limit the rate of change of pressure.

In order to avoid a pressure excessive to an extent which is liable to damage the enclosure or cabin, it is convenient to include in the method the steps of generating a voltage when a predetermined maximum differential pressure between the space pressure and the space ambient pressure is reached and using this voltage to override the voltage from the electronic means in order to control the valve means to reduce the pressure.

Figure 2:
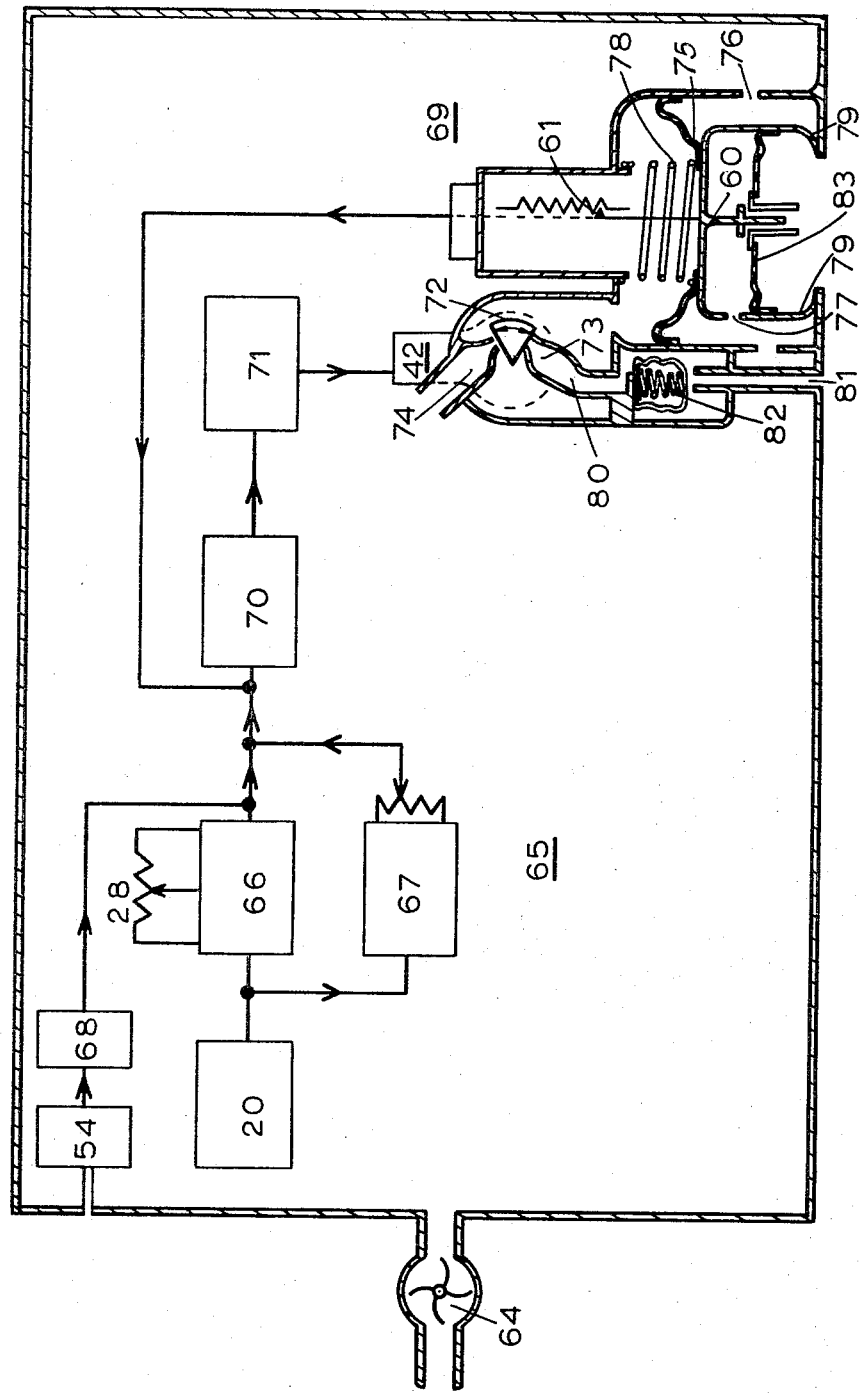

A presently preferred embodiment of a pressure control system according to the present invention will now be described by way of example only and with reference to the accompanying drawings in which, FIGURE 1 represents a circuit diagram of a pressure control system, FIGURE 2 represents a block diagram of a pressure control system and includes a view of a suitable electro-pneumatic discharge valve.

In the embodiment shown in FIGURE 1, an alternating current power source 1 supplies the primary coil 2 of a main transformer 3. The transformer 3 has four secondary coils 4, 5, 6 and 7.

One of the secondary coils 5 supplies a rectifier bridge 8, which operates to provide direct current to a positive rail 9 which powers the control system. The direct current is smoothed by capacitor 10 and 11 and a resistor 12 and the voltage is limited by a zener diode 13.

Another of the secondaries 4 supplies a rectifier bridge 14 which operates to provide direct current to a negative rail 15, which provides negative bias where required in the control system. The direct current is smoothed by capacitor 16 and 17 and a resistor 18, and a voltage is limited by a zener diode 19.

A third of the secondaries 6 of the main transformer 3 supplies alternating current by way of connections made between the points AA' to a pressure sensitive transducer 20 which is situated in the enclosed space or cabin. The transducer 20 includes a sealed capsule 21 which is coupled to a linear variable displacement transformer 22. Variations in the pressure of the cabin cause the capsule 21 to expand and contract and this inserts or retracts the core of the variable transformer 22 and increases or decreases the alternating current output of the transducer 20. The alternating current output is applied to the primary coil 23 of the input transformer 24 of the control unit. The input transformer 24 has two secondaries 25 and 26, one of which feeds a rectifier bridge 27 to produce a direct current signal voltage or absolute signal related to the pressure in the cabin. The bridge 27 is held at a positive voltage selected by adjustment of a variable resistor 28 which acts as a pressure (or altitude) selector. This variable resistor 28 is commonly placed in the enclosed space or cabin. The resultant of the bridge 27 output and the potential applied to the bridge is limited by two diodes 29 and 30 and the limited resultant voltage is applied to a direct coupled amplifier comprising two transistors 31 and 32.

The direct coupled amplifier is biassed with a negative potential to control the range of operation from resistors 33 and 34 in the biassing circuit applied by way of resistors 35 and 36.

The output from the direct coupled amplifier is fed through a resistor 37 and a zener diode 38 in order to attenuate the signal to a strength appropriate for feeding to an amplifier transistor 39 which also operates as a comparator which compares the resultant of the absolute voltage signal and the selected voltage signal with signals from three other sources which will be described hereinafter.

The output of the comparator transistor 39 feeds a power amplifier which includes two transistors 40 and 41 coupled as a super alpha pair. The power amplifier collector current passes through the windings 42 of a torque motor and actuates an electro-pneumatic discharge valve diagrammatically shown at 60 to open more widely for an increase in collector current.

The other secondary 25 of the control unit input transformer 24 feeds a rectifier bridge 43 which produces a negative D.C. signal related to the pressure in the cabin similar to that produced by bridge 27. However, in this case, the output is differentiated by a capacitor 44 and a resistor 45 so that the signal applied to the next stage, a direct coupled amplifier including transistors 46 and 47, is related to change in bridge output and consequently to rate of change of pressure and not to absolute pressure as in the circuit previously described.

The rate signal voltage applied to the direct coupled amplifier (transistors 46, 47), is varied by tapping a potentiometer 48 to alter the control of the rate signal. The rate is also limited to a maximum by a resistor 49 in series with the potentiometer 48 across the bridge 43 output. The potentiometer 48 is commonly situated in the enclosed space or cabin and operates as a rate of change of pressure selector or rate selector.

The direct coupled amplifier, transistors 46 and 47, is biassed with a negative potential via resistors 50 and 51 from resistors 52 and 53 which divide the voltage of the negative bias circuit appropriately. The amplifier is powered by a connection between points CC' from the positive rail 9.

The output of the direct coupled amplifier, transistors 46 and 47 carrying the rate signal is applied, similarly to the output of the absolute element and pressure selector, through the voltage limiting zener diode 38 to the base of the comparator transistor 39.

A fourth of the secondaries 7 of the main transformer 3 supplies alternating current to a second pressure sensitive transducer 54, in the cabin by way of connections made between points BB'. The transducer 54 incorporates a capsule 55 which is vented to the ambient air around the enclosed space by a hole 56. The capsule is coupled, as in the case of the previous transducer 20, to a linear variable displacement transformer 57, and differences in pressure between the cabin pressure and the ambient pressure around the cabin cause the capsule to expand and contract and vary the position of the core of the transformer to increase or decrease the alternating current output. This output is applied by connections made between the points DD' to a rectifier bridge 58 which applies a positive signal through a resistor 59 direct to the base of the comparator transistor 39.

In providing the remaining control; operation of the torque motor, by varying the current in the windings 42, controls the movement of a valve body 60 in an electro-pneumatic discharge valve to be described later. Coupled to the valve body 60 is the variable contact of a potentiometer 61 across which is applied the potential from the positive rail 9 of the control supply. The positive voltage from the contact of the potentiometer 61 is differentiated through a capacitor 62 and a resistor 63 and applied direct to the base of the comparator transistor 39 to give a voltage in proportion to the rate of movement of the valve, or valve velocity feedback voltage.

As shown in FIGURE 2 a blower 64 provides pressurising air to an enclosed space or cabin 65. In the cabin the absolute transducer 20 feeds the circuit 66 to be compared with the voltage corresponding to the selected pressure from potentiometer 28 and, at the same time, feeds the differentiating or rate circuit 67 to produce a rate of change of pressure signal in the form of a variable voltage. The output of these two circuits 66 and 67 is joined by the output of the differential transducer 55 and its associated circuits 68 and the velocity feedback from the wiper 61 attached to the valve body 60 of the electro-pneumatic valve 69. The four control signals are compared in the comparator 70 and produce a signal which affects the power amplifier 71 to control the current through the torque motor windings 42.

In the torque motor, in proportion to the current through the windings 42, an armature rotates away from an axis of symmetry of permanent magnets within the unit, up to a maximum of 7° of rotation.

In the case of a reduction of current through the windings, the armature returns automatically towards the axis of symmetry of the magnets.

The rotation of the armature causes a pad valve 72 to move away from an outlet restriction 73 and towards an inlet restriction 74. The inlet restriction allows air from the cabine into an enclosed compartment above a diaphragm 75 and the valve body 60, and this balances cabin air pressure admitted through apertures 76 and 77 to the underneath of the valve body 60 and diaphragm 75, and allows spring 70 to hold the valve seatings 79 closed.

When a current passes through the torque motor windings 42 and the pad valve 72 moves away from the outlet restriction 73, the air in the enclosed compartment above the diaphragm 75 and valve body 60 escapes down ducts 80 and 81 to ambient. The pressure of the cabin air below the diaphragm 75 is not balanced by an equivalent pressure above the diaphragm and the pressure lifts the valve body against the spring 78 and the valve seatings 79 open to allow air to be discharged from the cabin through aperture 76.

In the case of failure of the control system, and if the pressure within the compartment above the diaphragm 75 drops excessively, a capsule 82 is provided to expand and cut off the duct 81 which allows air to escape from the compartment. This causes the pressure above and below the diaphragm 75 and valve body 60 to equalise and the valve 60 will shut. A second diphragm 83 within the valve body 60 encloses a compartment below the valve body 60; the diaphragm 83 is acted upon by ambient air to lift the valve body 60 from its seatings 79 in the event of ambient pressure exceeding cabin pressure to an excessive amount. The valve then operates as an inwards relief valve, allowing air into the cabin.

In operation the operator or pilot selects the required pressure on the pressure (or altitude) selector potentiometer 28, FIGURE 1, and this applies a positive potential at a voltage in proportion to the required pressure across the bridge network 27 to the base of transistor 32. In the case of the pressure within the enclosed space or cabin being high, above the pressure selected on the selector 28, the capsule 21 in the absolute transducer 20 will be depressed, retracting the core of the displacement transformer 22 so that the transduced signal will be low and the negative output from the rectifier bridge 27 will not overcome the positive voltage from the pressure selector on the base of transistor 32. The resultant positive potential on the base of the transistor 32 reduces the emitter current as the transistor is of the pnp type so that the emitter potential rises towards that of the positive rail 9. This rise in positive potential applied to the base of transistor 32 increases the collector current, as the transistor 32 is of the npn type, so that the collector potential drops. The potential drop is transmitted to the base of the comparator transistor 39, where the tendency in the absence of other signals is to reduce the current through the comparator 39 and its collector potential rises. This causes the collector current of the power transistors 40 and 41 to increase through the torque motor windings 42 so that the electro-pneumatic valve 60 tends to open and allow air to escape from the cabin until the pressure in the cabin reduces to the selected pressure.

At this point, the capsule 21 will have expanded and increased the signal from the transducer 20, so that the output voltage from the bridge 27 will balance the voltage from the selector potentiometer 28 and the conditions described will reverse, reducing the current through the torque motor windings 42 and modulate the valve 60 to close slightly in order to maintain the pressure within the cabin.

In the case of the pressure in the cabin being below that required by the selector, the voltage from the transducer 20 and the bridge 27 will exceed the voltage from the selector 28. In this case the condition described fully above in the case of high pressure will reverse and the valve 60 will tend to close and remain in this condition until the blower 64 or other pressurising supply increases the pressure to the required state. Then the voltages from the bridge 27 and the selector 28 will approach each other and balance, modulating the valve to open slightly and maintain the pressure.

In the case of the pressure dropping because the valve 60 is open and air can escape, the signal from the absolute transducer 20 will be rising in potential as the capsule expands and affects the variable displacement transformer 22. This rising signal will produce a rising negative potential from the rectifier bridge 43 which, when applied to the differentiating network condenser 44 and resistor 45 will produce a negative potential at the base of the pnp transistor 46 of the direct coupled amplifier and cause it to conduct more strongly. The emitter potential will drop and cause transistor 46 to conduct less strongly which applies a rising potential from its collector to the comparator circuit. Here the product of the absolute signal voltage and the selector voltage falling for the valve to open is a falling potential. Thus the differentiating circuit partly cancels out the absolute signal and increases the potential at the base of the comparator transistor 40. The transistor 40 will conduct more current and the emitter potential will fall. This potential applied to the power amplifier, transistors 40 and 41, will reduce the current through the torque motor windings 42 and the valve will tend to close and reduce the rate of escape of air. Conversely a rising pressure will also be opposed by the rate circuit to produce a falling voltage at the base of the comparator transistor 30 and this will cancil out part of the increased potential due to the absolute signal and cause the comparator transistor to conduct less strongly. The power amplifier base potential will rise and the torque motor winding current 42 increase to hold the valve 60 in a more widely open state.

A similar effect to that of the rate circuit just described is produced by the valve velocity feedback; changes in potential from the potentiometer 61 caused by opening or closing the valve 60 are differentiated by capacitor 62 to apply an increasing or decreasing positive potential to the base of the comparator 39 so as to oppose the effect of the absolute signals causing the change of valve position. The effect of feedback is magnified by applying the differentiated output direct to the base of the comparator instead of attenuating the signal through the zener diode 38.

Finally an overring control is effected by the output from the differential transducer; if the pressure within the cabin is too high in relation to the ambient, the capsule 55 will be compressed and the core of the variable transformer will retract, so that the positive signal from the bridge 58 applied direct to the comparator 39 will reduce, thus the comparator 39 current will reduce. The collector potential will rise and cause an increased power amplified current to open the valve and allow the excessive pressure to exhaust to ambient.

It will be obvious to those skilled in the art that the scope of the invention includes a wide variety of transducers, and circuits which will achieve the same control function as the one just dsecribed, and that the various control units be employed to operate outlet valves of any satisfactory kind.

In addition to aircraft cabin pressurisation the invention is useful in hyperbaric chambers, ground base testing chambers, having varying ambient pressure conditions, and submersible pressure chambers.

In some cases it may be more convenient to control the air admitted to an enclosed space or cabin from a blower means instead of controlling the air exhausted from the cabin. The invention is equally suitable for controlling this function with appropriate modification to invert the operation of the valve.

I claim as my invention:

1. A control system for controlling the pressure of an enclosed space, including valve means, pressure selector means for selecting a desired pressure having an output voltage related to a selected desired pressure, said output voltage being an electrical reference signal adjustable by means of adjustable electrical control means, whereby desired pressure selections are made by the selection of a particular reference signal, an absolute element having an output related to the pressure of an enclosed space and electronic means for comparing the output voltage from the selector means with the output voltage from the absolute element to produce an output controlling the valve means.

2. A control system for an aircraft cabin including valve means cabin pressure selector means for selecting a desired cabin pressure having an output voltage related to a desired selected pressure, said output voltage being an electrical reference signal adjustable by means of adjustable electrical control means whereby desired pressure selections are made by the selection of a particular reference signal, an absolute element having an output voltage related to the cabin pressure and electronic means for comparing the output voltage from the cabin pressure selector means and electronic means for comparing the output voltage from the selector means with the output voltage from the absolute element to produce an output controlling the valve means.

3. A control system as claimed in claim 1 including an electrical differentiating circuit, the output from the absolute element being differentiated by said circuit to produce an output voltage proportional to the rate of change of amplitude of said output voltage from the absolute element, the output from the electrical differentiating circuit being applied to limit the rate of change of pressure within said enclosed space or said cabin.

4. A control system as claimed in claim 3 wherein the output from the electrical differentiating network is electronically compared with the output from the absolute element and the output from the selector means in order to produce a modified output controlling the valve means.

5. A control system as claimed in claim 1, including a differential element arranged to produce an output voltage when a maximum acceptable differential pressure valve between the enclosed space or cabin pressure and the space or cabin external or ambient pressure is reached, said output voltage from the differential element overriding the output voltage from other electronic controlling means in order to control the valve means so that the differential pressure does not exceed said maximum acceptable value.

6. A control system as claimed in claim 1, in which the position of the valve means controls a voltage which is differentiated to produce a valve velocity feedback voltage in relation to the rate of change position of the valve means, said valve velocity feedback voltage being applied to oppose any other electronic controlling means from the system altering the position of the valve means in order to reduce the rate of change of position of the valve means.

7. A control system, for controlling the pressure of an enclosed space including pressure selector means having an output signal related to a selected pressure, an absolute element having an output signal related to a selected pressure, an absolute element having an output signal related to the pressure in the enclosed space, and an electrical differentiating circuit which produces a signal related to the rate of change of pressure from the output signal from the absolute element.

8. A control system as claimed in claim 7, in which the resultant signal from said selected pressure output signal and said element output signal is opposed by said differentiating circuit output signal and the resultant of the three of said signals controls valve means.

9. A control system as claimed in claim 7, including a differential element having an output signal related to the difference in pressure between the pressure in the enclosed space and the ambient or pressure around the enclosed space, said differential output signal controlling valve means which reduce the differential pressure in the event of the differential pressure exceeding a maximum value.

10. A control system as claimed in claim 1, in which the position of the valve means controls a valve velocity feedback signal in relation to the rate of change of position of the valve, said feedback signal being applied to oppose any other controlling signal from the system causing the position of the valve means to change.

11. A method of controlling pressure in an enclosed space, for example, an aircraft cabin, by a pressure control system which includes valve means, the method including the steps of generating a voltage proportional to a desired selected pressure by selecting a desired pressure through adjusting an adjustable reference signal to a voltage proportional to the desired pressure, generating a voltage proportional to the pressure of the enclosed space and comparing the voltages by electronic means to produce an output controlling the valve means.

12. A method as claimed in claim 11, which includes differentiating a voltage proportional to the pressure of the enclosed space in order to obtain a voltage proportional to the rate of change of pressure in the rate of change of pressure in the enclosed space and applying this voltage in opposition to the voltage controlling the valve means in order to limit the rate of change of pressure.

13. A method as claimed in claim 11, which includes generating a voltage when a predetermined maximum differential pressure between the space pressure and the space ambient pressure is reached, and using this voltage to override the output voltage from the electronic means in order to control the valve means to reduce the pressure.

14. A method as claimed in claim 11, which includes generating a voltage in relation to the modulation of the valve means differentiating this voltage to obtain a voltage in relation to the rate of change of modulation of the valve means and applying the differential voltage to reduce the rate of change of modulation of the valve means.

15. A control system as claimed in claim 1, including valve means which are controlled to close when the selected pressure is greater than the enclosed space or cabin pressure.

16. A control system as claimed in claim 5, in which the valve means are controlled to open when the maximum differential pressure is reached.

17. A control system as claimed in claim 1, in which the system controls electro-pneumatic valve means.

18. A control system as claimed in claim 1 in which the elements include capsules operating transducers.

19. A method as claimed in claim 11, in which the valve means are controlled to close when the selected pressure is greater than the enclosed space or cabin pressure.

20. A method as claimed in claim 13, in which the valve means are controlled to open when a maximum differential pressure is reached.

21. A control system as claimed in claim 2 including an electrical differentiating circuit, the output from the absolute element being differentated by a circuit to produce an output voltage proportional to the rate of change of amplitude of said output voltage from the absolute element, the output from the electrical differentiating circuit being applied to limit the rate of change of pressure within said enclosed space or said cabin.

References Cited

UNITED STATES PATENTS

| 2,973,702 | 3/1961 | Andresen | 98—1.5 |
| 3,053,162 | 9/1962 | Andresen | 98—1.5 |
| 3,152,534 | 9/1964 | Molloy | 98—1.5 |

MEYER PERLIN, *Primary Examiner.*

Disclaimer 3,364,837.—*Reginald George Schooling*, Yeovil, Somerset, England. PRESSURE CONTROL SYSTEMS. Patent dated Jan. 23, 1968. Disclaimer filed Oct. 20, 1970, by the assignee, *Westland Aircraft Limited*.

Hereby enters this disclaimer to claims 1, 2, 5, 11, 13, 15, 16, 17, 18, 19 and 20 of said patent.

[*Official Gazette March 2, 1971.*]